3,072,493
GLASS FOR DIELECTRIC USES
Hendrikus Johan Lodewijk Trap, Emmasingel, Eindhoven, Netherlands, assignor to North American Philips Company, Inc., New York, N.Y., a corporation of Delaware
No Drawing. Filed Apr. 20, 1961, Ser. No. 104,251
Claims priority, application Netherlands May 6, 1960
2 Claims. (Cl. 106—53)

The invention relates to glasses which, in connection with their low temperature factor of the dielectric constant and their low dielectric losses are particularly suitable as a capacitor dielectric.

Glasses for dielectric uses are known, comprising 20–25 mol percent of $TiO_2$, 36–41 mol percent of PbO and 33–38 mol percent of $SiO_2$, if desired with a small addition of approximately 2 mol percent of $Al_2O_3$. The dielectric constant of these glasses is 20 to 25 and the dielectric loss factor ($tg\delta$) $20\times10^{-4}$ to $25\times10^{-4}$. These values hold at a frequency of approximately 3 mc./s. However, towards higher frequencies the loss factor soon becomes inadmissibly high. In addition, these glasses are not attractive in connection with the large tendency to devitrification.

The glasses of the composition according to the invention have a lower dielectric constant it is true, but, in a frequency range from approximately 1 to 100 mc./s., they have a loss factor which is low. In addition, they also have a low temperature coefficient of the dielectric constant. Even at the extremely high frequencies up to $2.4\times10^4$ mc./s., the loss factor is still reasonable, namely lower than 1%.

The glasses according to the invention are characterized by a composition of 35–55 mol percent of $SiO_2$, 2–25 mol percent of $TiO_2$, 10–15 mol percent of PbO and totally 15–45 mol percent of $K_2O+CaO+SrO+BaO$, the ratio in mol percent of each of the latter oxides with respect to each of the other of the latter oxides lying between 5/3 and 3/5.

At a mutual ratio of the oxides of K, Ca, Sr and Ba, which lies outside these limits, devitrification occurs.

When the oxides $K_2O$, CaO, SrO and BaO are chosen in equimolar quantities at a PbO-content of 12 mol percent, the most favourable value of the dielectric loss factor is obtained. In this case, $tg\delta$ is substantially independent of the frequency in the whole range of from 1 to 100 mc./s.

In the glasses according to the invention, the presence of the oxides $Li_2O$, $Na_2O$, MgO, ZnO, $Sb_2O_3$, $Al_2O_3$, $B_2O_3$ and $P_2O_5$ should be avoided as much as possible, because they have an unfavourable influence on one or more of the dielectric properties.

With the glasses according to the invention, capacitors can be manufactured in known manner, for example by metallizing opposite sides with silver.

EXAMPLE

A number of glass samples is manufactured by heating a mixture of the powdered oxides $SiO_2$, $TiO_2$, PbO, $K_2O$, CaO, SrO and BaO in a quartz crucible at a temperature which varies between approximately 1460° C. and 1550° C. for 3 hours. As regards the quantities required to obtain the composition chosen, it is noted that the fact should be taken into account that in this treatment a small quantity of PbO and $TiO_2$ evaporates at that $SiO_2$ is taken up by the melt from the quartz of the crucible.

Then the samples are ground to disks having a surface of approximately 20 cm.$^2$ and a thickness of 2 mm. After the plane parallel surfaces have been thoroughly polished smooth, they are silver-plated in the commonly used manner and provided with contact wires.

In the following table, the values are summarized of the dielectric constant ($\epsilon$) at frequencies of 1.5 and $2.4\times10^4$ mc./s., the loss factor ($tg\delta$) at 1.5–100 and $2.4\times10^4$ mc./s., and the temperature coefficient of the dielectric constant $$\text{T.C.}=\frac{1}{\epsilon}\frac{\partial \epsilon}{\partial T}$$

at a frequency of 1.5 mc./s., measured at capacitors manufactured in the above described manner.

| Composition (mol percent) | | | | | | | $tg\delta+10^4$ at— | | | $\epsilon$ at— | | T.C. $\times 10^6$ at 1.5 mc./s |
|---|---|---|---|---|---|---|---|---|---|---|---|---|
| $SiO_2$ | $TiO_2$ | PbO | $K_2O$ | CaO | SrO | BaO | 1.5 mc./s. | 100 mc./s. | $2.4\times10^4$ mc./s. | 1.5 mc./s. | $2.4\times10^4$ mc./s. | |
| 44 | 2 | 12 | 10.5 | 10.5 | 10.5 | 10.5 | 10.5 | 12.9 | ------ | 10.0 | -------- | 136 |
| 44 | 4 | 12 | 10 | 10 | 10 | 10 | 9.7 | 11.4 | 71 | 10.2 | 9.82 | 130 |
| 44 | 12 | 12 | 8 | 8 | 8 | 8 | 8.7 | 12.0 | 69 | 11.2 | 10.49 | 86 |
| 44 | 12 | 12 | 7 | 9 | 9 | 7 | 9.5 | 17.6 | ------ | 10.7 | -------- | 96 |
| 44 | 12 | 12 | 6.5 | 9.5 | 9.5 | 6.5 | 10.5 | 17.7 | ------ | 10.8 | -------- | 107 |
| 44 | 12 | 12 | 6 | 10 | 10 | 6 | 9.35 | 16.2 | ------ | 11.3 | -------- | 118 |
| 44 | 16 | 12 | 7 | 7 | 7 | 7 | 9.0 | 11.9 | 72 | 11.3 | 10.77 | 93 |
| 44 | 20 | 12 | 6 | 6 | 6 | 6 | 8.1 | 10.3 | 70 | 12.5 | 10.35 | 110 |
| 52 | 6 | 12 | 7.5 | 7.5 | 7.5 | 7.5 | 9.9 | -------- | ------ | 11.1 | 9.86 | 116 |
| 52 | 12 | 12 | 6 | 6 | 6 | 6 | 10.4 | 13.0 | 72 | 12.1 | 10.34 | 116 |
| 52 | 12 | 12 | 5.5 | 6.5 | 6.5 | 5.5 | 10.8 | 19.2 | ------ | 10.5 | -------- | 102 |
| 52 | 12 | 12 | 5 | 7 | 7 | 5 | 10.4 | 16.1 | ------ | 10.8 | -------- | 101 |
| 52 | 12 | 12 | 4.5 | 7.5 | 7.5 | 4.5 | 9.9 | 17.4 | ------ | 11.1 | -------- | 99 |
| 52 | 14 | 12 | 5.5 | 5.5 | 5.5 | 5.5 | 9.9 | 12.0 | 70 | 12.5 | 11.00 | 112 |
| 46 | 6 | 12 | 9 | 9 | 9 | 9 | 10.5 | 12.6 | ------ | 10.75 | 9.86 | 129 |
| 42 | 10 | 12 | 9 | 9 | 9 | 9 | 8.3 | 11.1 | ------ | 10.85 | -------- | ------ |
| 51 | 17.5 | 10.5 | 5.25 | 5.25 | 5.25 | 5.25 | 10.4 | 19.6 | 87 | 11.6 | 10.95 | 104 |
| 37 | 22.5 | 13.5 | 6.75 | 6.75 | 6.75 | 6.75 | 9.7 | 19.3 | ------ | 12.3 | 11.15 | 113 |
| 51 | 14 | 10.5 | 6.13 | 6.13 | 6.12 | 6.12 | 10.7 | 15.6 | ------ | 11.1 | -------- | 92 |
| 37 | 18 | 13.5 | 7.87 | 7.88 | 7.88 | 7.87 | 9.3 | 14.3 | 80 | 11.6 | 10.9 | 98 |
| 51 | 10.5 | 10.5 | 7 | 7 | 7 | 7 | 8.55 | 19.6 | 86 | 10.7 | 9.85 | 83 |
| 37 | 13.5 | 13.5 | 9 | 9 | 9 | 9 | 8.85 | 14.9 | 74 | 11.8 | 11.35 | 96 |

Note.—The composition in percent by weight of the composition set forth in mol percent in this table is given in the following table wherein each composition in weight percent corresponds to the corresponding composition in mol percent.

Table

[Composition in percent by weight]

| SiO$_2$ | TiO$_2$ | PbO | K$_2$O | CaO | SrO | BaO |
|---|---|---|---|---|---|---|
| 27.08 | 1.64 | 27.46 | 10.14 | 6.03 | 11.15 | 16.50 |
| 27.20 | 3.29 | 27.58 | 9.70 | 5.77 | 10.64 | 15.79 |
| 27.70 | 10.05 | 28.09 | 7.91 | 4.71 | 8.69 | 12.86 |
| 27.96 | 10.15 | 28.34 | 6.97 | 5.34 | 9.87 | 11.36 |
| 28.10 | 10.20 | 28.48 | 6.51 | 5.67 | 10.45 | 10.60 |
| 28.23 | 10.24 | 28.61 | 6.03 | 5.99 | 11.07 | 9.83 |
| 27.97 | 13.53 | 28.38 | 6.97 | 4.16 | 7.67 | 11.36 |
| 28.23 | 17.07 | 28.61 | 6.03 | 3.59 | 6.64 | 9.83 |
| 33.46 | 5.13 | 28.70 | 7.56 | 4.51 | 8.31 | 12.32 |
| 33.93 | 10.42 | 29.11 | 6.14 | 3.65 | 6.76 | 10.00 |
| 34.10 | 10.47 | 29.25 | 5.66 | 3.98 | 7.35 | 9.20 |
| 34.26 | 10.52 | 29.39 | 5.17 | 4.31 | 7.95 | 8.41 |
| 34.42 | 10.57 | 29.53 | 4.67 | 4.64 | 8.55 | 7.61 |
| 34.14 | 12.22 | 29.29 | 5.66 | 3.37 | 6.11 | 9.22 |
| 28.82 | 5.00 | 27.94 | 8.85 | 5.27 | 9.73 | 14.39 |
| 26.08 | 8.26 | 27.71 | 8.77 | 5.22 | 9.65 | 14.28 |
| 34.30 | 15.65 | 26.23 | 5.53 | 3.29 | 5.98 | 9.01 |
| 22.73 | 18.38 | 30.81 | 6.51 | 3.88 | 7.15 | 10.58 |
| 33.96 | 12.39 | 25.98 | 6.41 | 3.81 | 7.04 | 10.41 |
| 22.52 | 14.47 | 30.53 | 7.51 | 4.48 | 8.28 | 12.23 |
| 33.68 | 9.22 | 25.76 | 7.24 | 4.32 | 7.97 | 11.80 |
| 22.27 | 10.82 | 30.20 | 8.50 | 5.06 | 9.35 | 13.83 |

What is claimed is:

1. Glass for dielectric uses, having a low temperature coefficient of the dielectric constant and a loss factor (tan δ) of less than 1% up to frequencies of $2.4 \times 10^4$ mc./s., said glass consisting essentially of 22–35% by weight of SiO$_2$, 1.5–19% by weight of TiO$_2$, 25–31% by weight of PbO, 4.5–10.5% by weight of K$_2$O, 3–6.5% by weight of CaO, 5.5–11.5% by weight of SrO and 8–17% by weight of BaO.

2. The glass of claim 1 wherein about 27% by weight of PbO, 10% by weight of K$_2$O, 6% by weight of CaO, 11% by weight of SrO and 16.5% by weight of BaO is present.

References Cited in the file of this patent
UNITED STATES PATENTS 2,220,765    Hirose et al. _____ Nov. 5, 1940
2,992,122    Beck et al. _____ July 11, 1962